(12) United States Patent
Chang

(10) Patent No.: US 6,988,907 B2
(45) Date of Patent: Jan. 24, 2006

(54) SECTIONAL ADAPTER OF CLAMPING HOLDER FOR AUTOMOBILES

(76) Inventor: Ta-Shuo Chang, P.O.Box 24-108, Taipei (TW)

( * ) Notice: Subject to any disclaimer, the term of this patent is extended or adjusted under 35 U.S.C. 154(b) by 0 days.

(21) Appl. No.: 10/791,611

(22) Filed: Mar. 3, 2004

(65) Prior Publication Data
US 2005/0196999 A1  Sep. 8, 2005

(51) Int. Cl.
H01R 4/50  (2006.01)
(52) U.S. Cl. .................. 439/345; 439/638; 439/929
(58) Field of Classification Search ............... 439/345, 439/350, 357, 366, 626, 638, 639, 929; 320/114, 320/115; 379/426, 446, 447, 449
See application file for complete search history.

(56) References Cited
U.S. PATENT DOCUMENTS 5,179,590 A * 1/1993 Wang ........................ 379/454
5,392,350 A * 2/1995 Swanson .................... 379/446
5,414,770 A * 5/1995 Wang ........................ 379/446
5,847,924 A * 12/1998 Youn ......................... 361/686
6,231,370 B1 * 5/2001 Morin et al. ............... 439/366
6,542,757 B2 * 4/2003 Bae .......................... 455/575.2

* cited by examiner

Primary Examiner—Khiem Nguyen

(57) ABSTRACT

The present invention discloses a sectional adapter of a clamping holder for automobiles, which can be fixed inside a car by clamping or sticking and has a clamping member for clamping a mobile phone, a PDA, or a palm game. A socket electrically connected to the internal circuit of the adapter is disposed at the rear end of the main body of the clamping holder, so that an adapter can be inserted into the socket to constitute an electrical connection. The adapter is mounted onto the clamping holder by a snap-in member, and a plug of various shapes is disposed at the front edge of the upper section of the adapter for connecting to a corresponding connector of an electronic device.

4 Claims, 3 Drawing Sheets

SECTIONAL ADAPTER OF CLAMPING HOLDER FOR AUTOMOBILES

FIELD OF THE INVENTION

The present invention relates to a sectional adapter of a clamping holder for automobiles, more particularly to an adapter applicable for plugging different appliances such as a mobile phone, a PDA, or a palm game. Regardless of its manufacture or application for the use in automobiles, the traditional adapter generally requires different sets of corresponding clamping holders for the electrical connection, and thus having the shortcomings of being inconvenient and inapplicable. Therefore, improvements were made by clamping or sticking the clamping holders inside an automobile, and the clamping holder has a clamping member for clamping a mobile phone, a PDA, or a palm game, and a socket disposed at the rear end of the main body and electrically connected to the internal circuit and further electrically connected to an adapter by a plug-and-socket relation. The adapter is mounted onto the clamping holder by a snap-in member, and plugs of various shapes are disposed at the front edge of the upper section of the adapter for connecting to corresponding connectors of electronic appliances. With the snap-in member and the adapter, the present invention provides a simple way of accessing, removing, or replacing an electronic appliance from the clamping holder and has the features of being low-priced and capable of changing to corresponding adapters in order to fit the desired clamping devices. The clamping holder of the present invention can accommodate different electronic appliance including mobile phones, PDAs, or palm games of different brands and forms for a quick and convenient electrical connection, and thus greatly improving the usage and the scope of applicability of a clamping holder, and also avoiding unnecessary costs and reducing the volume for storage and transportation.

BACKGROUND OF THE INVENTION

Since the usage of mobile phones, PDAs, or palm games become more popular day after day. In order to maintain safety driving, many countries have prohibited drivers from using mobile phones, PDAs, or palm games when driving a car. Further, the power supply of a car is used for supplying power and charging a battery when these appliances are used in the car. To concurrently meet the requirements for convenience and safety, an automobile usually is equipped with a battery charger or hand-free clamping holder. Further, there are different types and specifications of the sockets, but the battery chargers or hand-free clamping holders are designed for single model only and thus are applicable to a specific model or a specific type of electronic appliances. Besides the costs, such arrangement also occupies space and cause confusions. When a different electronic appliance or a different model is used, it usually requires to buy new battery chargers or hand-free clamping holders again. Let us assume there are several tens of manufacturers, and each has several different models of connectors. Furthermore, these appliances have a short life cycle, and new models are coming out constantly, and users keep buying them. It is a waste to keep buying and throwing away different adapters and clamping holders repeatedly. Such arrangement also causes inconvenience and trouble to manufacturing for the inventory and storage. In addition, it is inconvenient for users to carry many different sets of clamping holders in a car for the use of an electronic appliance such as a mobile phone, a PDA, or a palm game. Both inconvenience and increased cost are the major subjects that deserve immediate improvements.

SUMMARY OF THE INVENTION

In view of the shortcomings of the conventional adapter of clamping holders for automobiles, the inventor of this invention based on years of experience on the production and design of clamping holders for motor vehicles to conduct researches and experiments to overcome the foregoing shortcomings and finally invented the adapter of clamping holder device for automobiles.

The primary objective of the present invention is to provide a sectional adapter of clamping holder for automobiles, which can be fixed inside a car by clamping or sticking and has a clamping member for clamping an electronic appliance such as a mobile phone, a PDA, or a palm game. A socket electrically connected to the internal circuit of the adapter is disposed at the rear end of the main body of the clamping holder, so that an adapter can be inserted into the socket to constitute an electrical connection. The adapter is mounted onto the clamping holder by a snap-in member, and plugs of various shapes are disposed at the front edge of the upper section of the adapter for connecting to corresponding connectors of electronic appliances. With the snap-in member and the adapter, the present invention provides a simple way of accessing, removing, or replacing an electronic device from the clamping holder and has the features of being low-priced and capable of changing to different corresponding adapters in order to fit the desired clamping device. The clamping holder of the present invention can accommodate different electronic devices including mobile phones, PDAs, or palm games of different brands and forms for a quick and convenient electrical connection, and thus greatly improving the usage and the scope of applicability of a clamping holder, and also avoiding unnecessary costs and reducing the volume for storage and transportation.

The secondary objective of the present invention is to provide a sectional adapter of clamping holder for automobiles, which installs a voltage transform circuit or a multiple-voltage switch circuit in the main body of the adapter to change the voltages for different mobile phones, PDAs, or palm games, and thus greatly expanding the scope of its applications and achieving the multiple applications of the adapter.

DETAILED DESCRIPTION OF THE PREFERRED EMBODIMENTS

Figure 2:
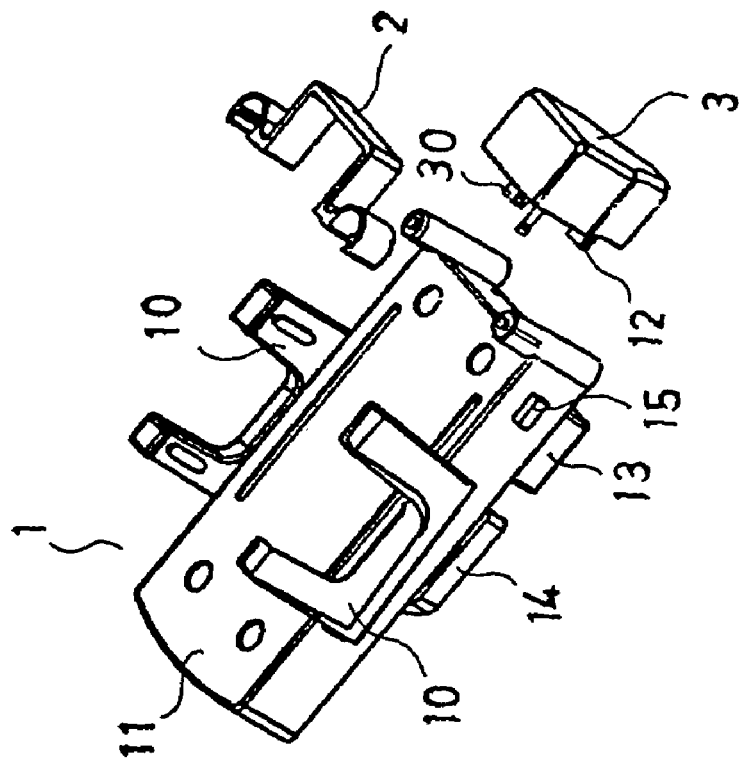
FIG. 2 is an exploded view of the clamping holder according to a preferred embodiment of the present invention.
Figure 1:
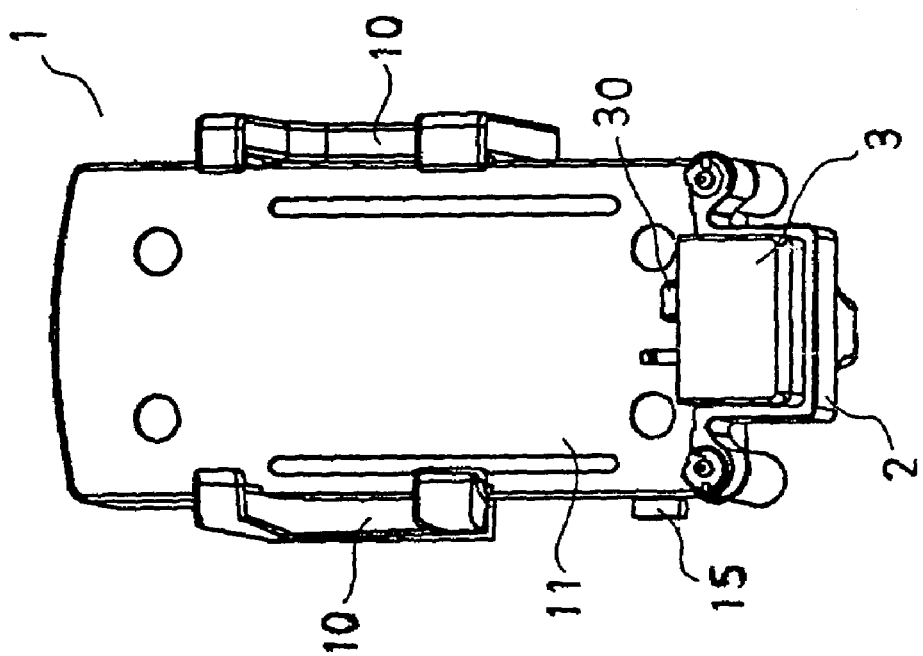
FIG. 1 is a perspective view of the clamping holder according to a preferred embodiment of the present invention.
Figure 3:
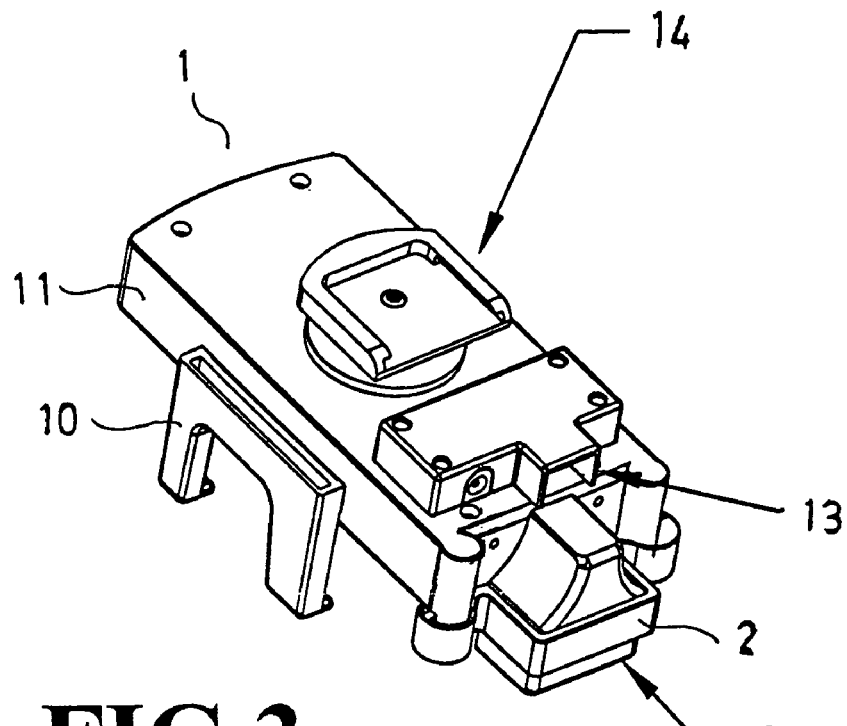
FIG. 3 is a perspective view of the rear side of the clamping holder according to a preferred embodiment of the present invention.
Figure 4:
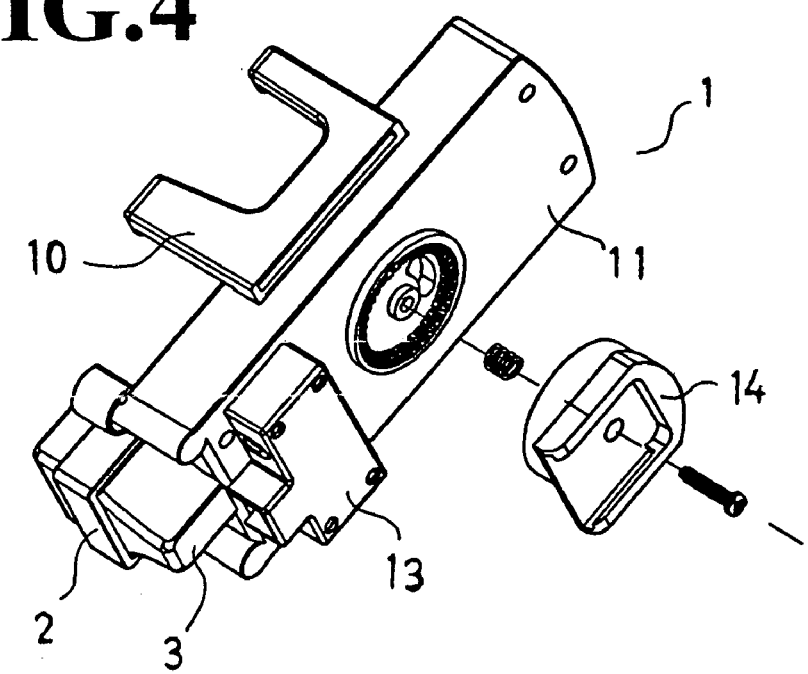
FIG. 4 is an exploded view of the rear side of the clamping holder according to a preferred embodiment of the present invention.
Figure 6:
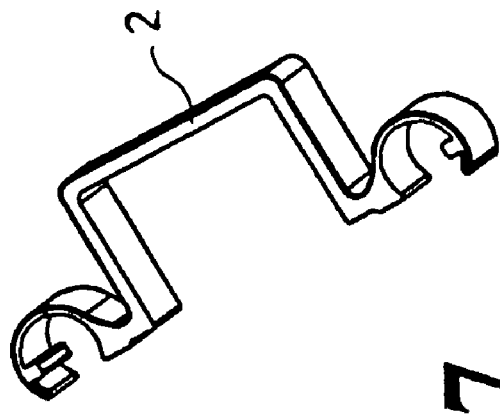
FIG. 6 is a perspective view of the adapter according to a preferred embodiment of the present invention.
Figure 7:
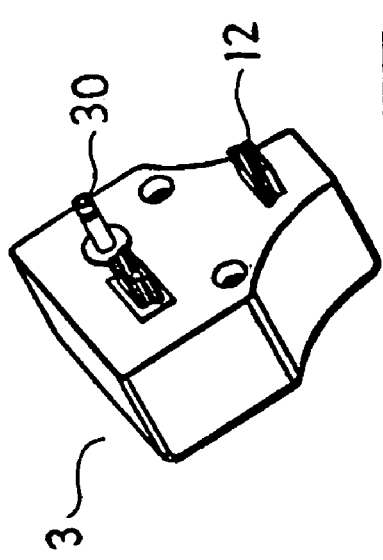
FIG. 7 is a perspective view of the snap-in member according to a preferred embodiment of the present invention.
Figure 5:
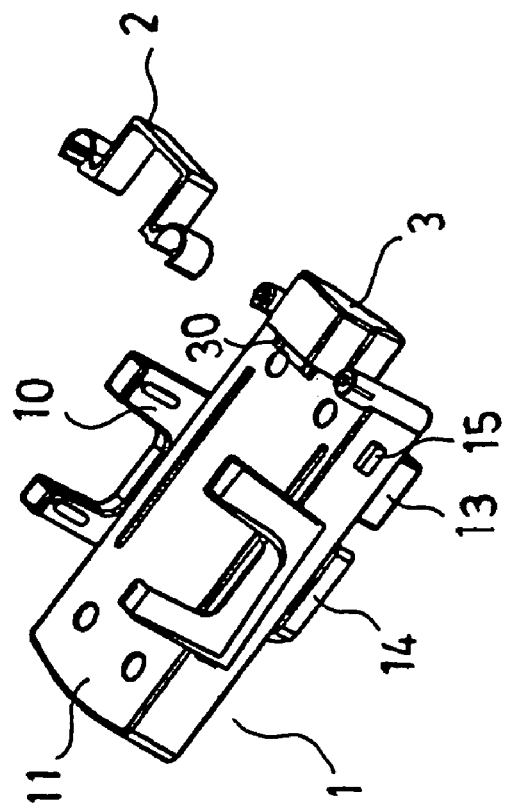
FIG. 5 is an exploded view of the front side of the clamping holder according to a preferred embodiment of the present invention.

To make it easier for our examiner to understand the objective of the invention, its structure, innovative features, and performance, we use a preferred embodiment together with the attached drawings for the detailed description of the invention.

Please refer to the figures for the present invention. The present invention comprises a clamping holder 1, a snap-in member 2, and an adapter 3; wherein the clamping holder 1 mounts a fixing base 4 base 14 inside an automobile or into a power socket by clamping or sticking, and comprises a clamping member 10 serving as a retainer to fix a mobile phone, a PDA, or a palm game. A socket is disposed at the rear end of a main body 11 for electrically connected to an internal circuit, and the internal circuit is connected to the socket through the bottom of power socket 13 or directly connected to the power socket of automobile. A connector 12 of an adapter 3 is connected to the socket to constitute an electrical connection The adapter 3 is mounted onto the clamping holder 1 by the snap-in member 2. In the figure, the embedding groove and screws are used for the connection. Further, a connector 30 of different forms is disposed at the front end of the upper section of the adapter 3 for connecting the electronic appliance such as a mobile phone, a PDA, or a palm game. Further, a voltage transform circuit or a multiple-voltage switch circuit is disposed inside the adapter 3 (such circuit is very common in transformers, and has different kinds, and thus will not be described here.) for changing the voltage for supplying power to the connectors 30 of different electronic appliances.

If the present invention only has the clamping function in its practical application, users can insert a fixing base 14 into the cigarette lighter socket in an automobile or mount the fixing base 14 inside the automobile. Different connectors 30 for the adapter 3 can be adopted adapted to fit the corresponding desired clamping appliances. The adapter 3 is connected to the socket at the rear end of the main body 22 body 11 by a connector 12, and the snap-in member 2 fixes the two together. A press button 15 is used to extend the clamping member 10 and thus inserting the desired clamping appliance into the connector 30 at the upper section of the front of an adapter 3 from the main body 11. By means of the blocking of the snap-in member 2 and the clamping of the clamping member 10, the clamping appliance can be securely clamped onto the clamping holder 1. Since the snap-in member 2 and the adapter 3 are simple installable and removable modules and low-priced, therefore an adapter 3 with different connectors is provided for clamping different appliances. Different installable and removable modules can provide a quick installation or a quick removal of the corresponding socket of appliances such as different branded mobile phones, PDAs, or palm games. The present invention improves the usage and scope of applicability of the clamping holder 1, and avoids unnecessary costs, and reduces the volume for storage and transportation. Further, the circuit installed in the main body 11 is electrically connected to the bottom of the power socket 13 or directly to the power socket of the automobile. Besides the electrical connection, the adapter 3 also has a voltage transform circuit or a multiple-voltage switch circuit for changing the voltage for supplying power to different appliances on the connector 30 in order to meet different voltage requirements.

In summation of the above description, the present invention enhances the performance of the conventional structure, and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sectional adapter of clamping holder for automobiles, comprising:
a clamping holder, being a retainer mounted inside an automobile by a fixing base, and having a clamping member for clamping an electronic appliance; characterized in that said clamping holder comprising a socket disposed at the rear end of a main body of said clamping holder and said socket being coupled to a connector of an adapter, and said adapter being coupled onto said clamping holder by a snap-in member, and having a plug of different forms disposed at the front end of the upper section of said adapter for connecting to said appliance selected from a collection of a mobile phone, a PDA, and a palm game.

2. The sectional adapter of clamping holder for automobiles of claim 1, wherein said adapter is electrically coupled to an internal circuit in said main body of said clamping holder through said connector, and said internal circuit of said main body is connected to a power supply socket in said automobile.

3. The sectional adapter of clamping holder for automobiles of claim 2, wherein said adapter has a voltage transform circuit for changing voltages for power supply.

4. The sectional adapter of clamping holder for automobiles of claim 2, wherein said adapter has a plurality of voltage transform circuits for transforming voltages for power supply.

* * * * *